US008041359B1

(12) United States Patent
Pittampalli

(10) Patent No.: US 8,041,359 B1
(45) Date of Patent: Oct. 18, 2011

(54) METHOD FOR MAINTAINING A COMMUNICATION LINK IN WIRELESS NETWORK GROUPS

(75) Inventor: Eshwar Pittampalli, Randolph, NJ (US)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 09/365,678

(22) Filed: Aug. 2, 1999

(51) Int. Cl.
*H04W 36/00* (2009.01)

(52) U.S. Cl. .......... 455/444; 455/432.1; 455/435.1; 455/436; 455/449; 455/450

(58) Field of Classification Search ........ 455/454, 455/435, 439, 432, 426, 447, 435.1, 436, 455/451, 452.1, 452.2, 444, 450; 375/132, 375/134
See application file for complete search history.

(56) References Cited

U.S. PATENT DOCUMENTS

| | | | | |
|---|---|---|---|---|
| 5,396,541 A | * | 3/1995 | Farwell et al. | 455/403 |
| 5,448,569 A | * | 9/1995 | Huang et al. | 370/332 |
| 5,526,402 A | * | 6/1996 | Dent et al. | 379/59 |
| 5,574,973 A | | 11/1996 | Borth et al. | 455/33.1 |
| 5,633,888 A | * | 5/1997 | Stewart | 375/132 |
| 5,649,000 A | * | 7/1997 | Lee et al. | 455/436 |
| 5,937,353 A | * | 8/1999 | Fapojuwo | 455/444 |
| 6,041,358 A | * | 3/2000 | Huang et al. | 709/238 |
| 6,151,510 A | * | 11/2000 | Zicker | 455/553 |
| 6,243,593 B1 | * | 6/2001 | Zicker | 455/553 |
| 6,256,334 B1 | * | 7/2001 | Adachi | 375/132 |
| 6,295,310 B1 | * | 9/2001 | Yamauchi et al. | 375/133 |
| 6,393,261 B1 | * | 5/2002 | Lewis | 455/103 |
| 6,535,732 B1 | * | 3/2003 | McIntosh et al. | 455/445 |
| 6,912,230 B1 | * | 6/2005 | Salkini et al. | 370/466 |

FOREIGN PATENT DOCUMENTS

| | | |
|---|---|---|
| CA | 2106063 | 8/1993 |
| CA | 2 106 692 | 9/1993 |
| CA | 2106062 | 4/1994 |
| EP | 0 766 490 | 2/1997 |
| EP | 0766 490 A2 | 4/1997 |
| EP | 0 851 633 | 1/1998 |
| WO | WO 99/29126 | 6/1999 |

OTHER PUBLICATIONS

"Piconet: Embedded Mobile Networking", Bennett, F. et al., *IEEE Personal Communications*, vol. 4 No. 5, pp. 8-15 (Oct. 1, 1997).
"Bluetooth-The Universal Radio Interface for ad hoc, Wireless Connectivity", by Haartsen, J., *Ericsson Review*, Stockholm, SE, No. 3 p. 110-117 (1998.

(Continued)

*Primary Examiner* — Dai A Phuong
(74) *Attorney, Agent, or Firm* — Harness, Dickey & Pierce, P.L.C.

(57) ABSTRACT

Disclosed herein is a method and apparatus for maintaining communication between a dependent and a communications network when the dependent is outside a coverage area associated with its master using a controller and a communications network. In one embodiment, when the dependent is in a piconet, the dependent is within communication range of its master using a communication channel on frequency band $f_{band}(1)$. When the dependent moves outside the piconet, the dependent should be within communication range of the controller and, thus, switches to another communication channel within frequency band $f_{band}(1)$ such that it may communicate with the controller. When the dependent moves outside the communication range of the controller, the dependent should be within communication range of a communications network or a base station and, thus, switches to a communication channel within another frequency band $f_{band}(2)$.

12 Claims, 4 Drawing Sheets

OTHER PUBLICATIONS

"Handover Execution", Mouly, M. et al., *Fr. Lassay-Les-Chateau*, Europe, Media, pp. 396-412 (1993).

"Hiperlan: The High Performance Radio Local Area Network Standard", by Halls, G. A., Electronics and Communication Engineering Journal, No. 6 London, GB, pp. 289-296 (Dec. 1, 1994).

Markus Albrecht, et al "IP Services Over Bluetooth: Leading the Way to a New Mobility", *Local Computer Networks*, Lowell, MA (Oct. 18-20, 1999), pp. 2-11.

Jaap Haartsen, "Bluetooth—The Universal Radio Interface for Ad Hoc, Wireless Connectivity", *On—Ericsson Review, Ericsson*, Stockholm SE, (1998), pp. 110-117.

M. Mouly, et al, "Handover Criteria", *GSM System for Mobile Communications, Lassay-Les-Chateaux*, Europe Media, FR, (1993), pp. 329, 396-401.

European Search Report.

* cited by examiner

400

METHOD FOR MAINTAINING A COMMUNICATION LINK IN WIRELESS NETWORK GROUPS

FIELD OF THE INVENTION

The present invention relates generally to wireless communication systems and, in particular, to wireless networks.

BACKGROUND OF THE RELATED ART

FIG. 1 depicts a wireless network 10 referred to herein as a piconet in accordance with the prior art. Piconet 10 comprises a master 12 and one or more dependents 14. Master 12 is a communication device that may be directly or indirectly connected to communications network 16, such as a Public Switching Telephone Network (PSTN) or another wireless network. Master 12 being operable to communicate with dependents 14 over a wireless interface and having hardware and software for controlling and managing data or voice transmissions among dependents 14 and communications network 16. Dependents 14 are devices for communicating with master 12 over a wireless interface. For example, suppose master 12 is a telephone switchboard that is connected to a PSTN and dependent 14 is a wireless telephone. In this example, the communication path goes from the wireless telephone to the telephone switchboard to the PSTN, and vice-versa.

Master 12 and dependents 14 are operable to communicate with each other so long as dependents 14 are within the coverage area of the piconet, which is defined by the communication range of master 12. Typically, master 12 has a communication range of a few meters. If dependents 14 are mobile devices, such as wireless terminals, and move beyond the communication range of master 12, dependents 14 would be unable to communicate with master 12 and, thus, be unable to maintain a communication link with communications network 16. Accordingly, there exists a need for dependents 14 to maintain communication with communications network 16 when dependents 14 move outside the coverage area of the piconet.

SUMMARY OF THE INVENTION

The present invention is a method and apparatus for maintaining communication between a dependent and a communications network when the dependent is outside a coverage area associated with its master using a controller and a communications network. In one embodiment, when the dependent is in a piconet, the dependent is within communication range of its master using a communication channel on frequency band $f_{band}(1)$. When the dependent moves outside the piconet, the dependent should be within communication range of the controller and, thus, switches to another communication channel within frequency band $f_{band}(1)$ such that it may communicate with the controller. When the dependent moves outside the communication range of the controller, the dependent should be within communication range of a communications network or a base station and, thus, switches to a communication channel within another frequency band $f_{band}(2)$.

BRIEF DESCRIPTION OF THE DRAWINGS

The features, aspects, and advantages of the present invention will become better understood with regard to the following description, appended claims, and accompanying drawings where

DETAILED DESCRIPTION

Figure 1:
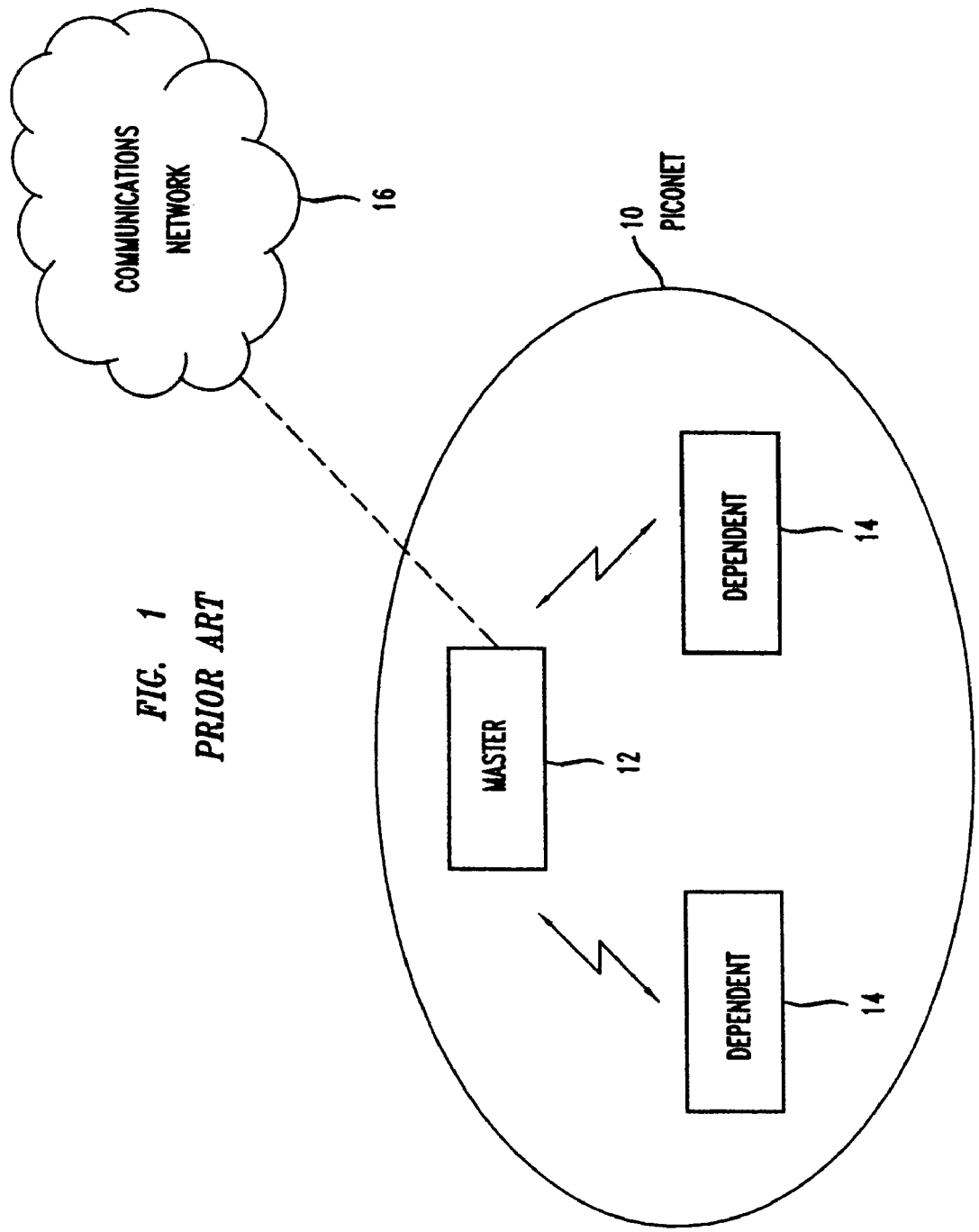
FIG. 1 depicts a wireless network referred to herein as a piconet in accordance with the prior art.
Figure 2:
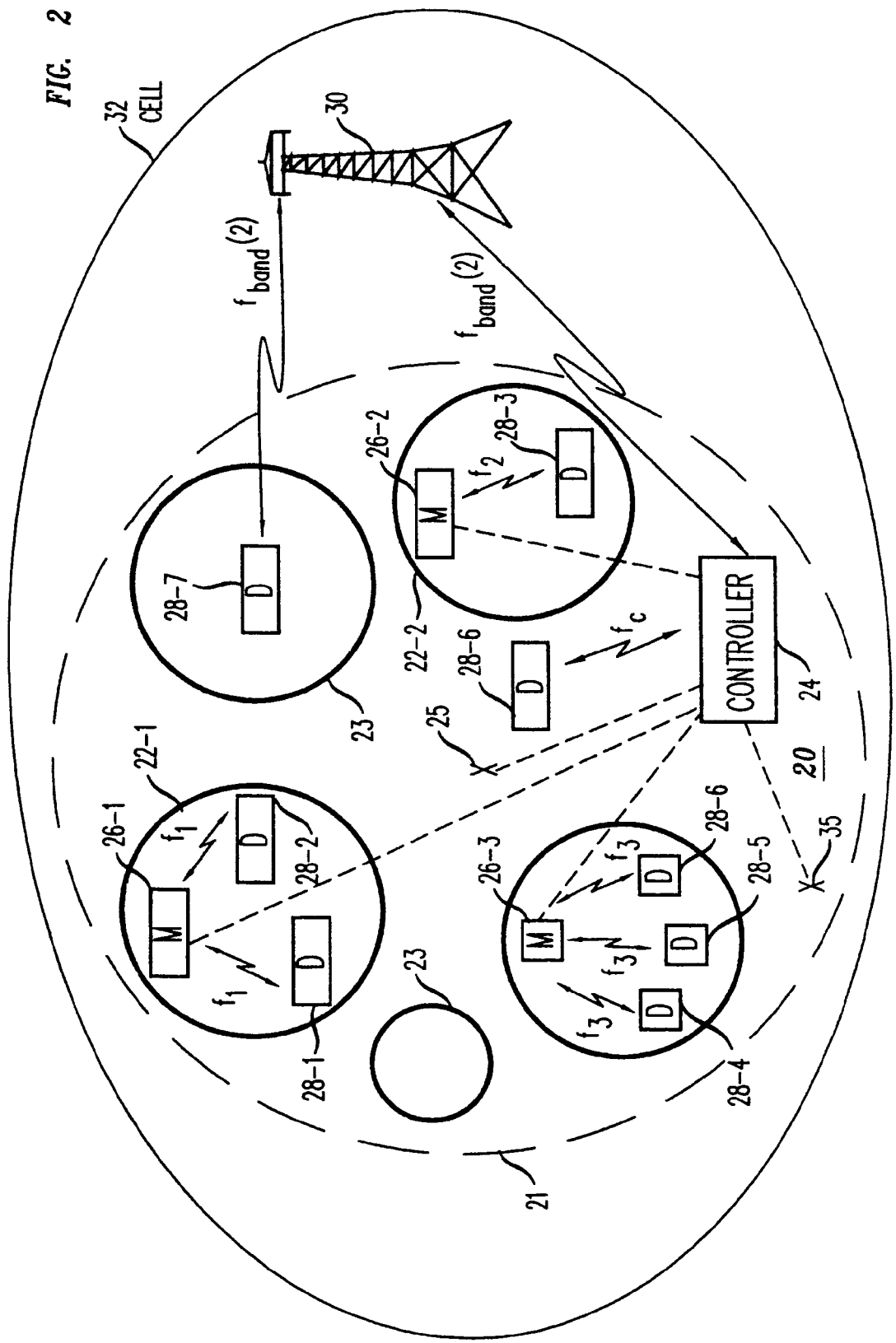
FIG. 2 a wireless network group in accordance with the present invention.

FIG. 2 depicts a wireless network group 20 in accordance with the present invention. Wireless network group 20 has an associated geographical area 21, such as one or more floors within a building, which is within a coverage area or cell 32 associated with base station 30 is a part of a communications network. Base station 30 is well-known in the art. Wireless network group 20 comprises a plurality of piconets 22-$j$ and a controller 24 which are within the geographical area 21. Each piconet 22-$j$ comprises a master 26-$j$ and zero or more dependents 28-$k$. Master 26-$j$ being a communication device for communicating with dependents 28-$k$ and controller 24, and having hardware and software for controlling and managing data transmissions among dependents 28-$k$ and controller 24.

Masters 26-$j$ are private local devices in control of communications in designated piconet coverage areas among its dependents 28-$k$ and controller 24. By contrast, base station 30 is a public unit that provides wireless communications services for designated macro and/or micro cellular or PCS areas, i.e., cell 32. Base station 30 is also operable to communicate with controller 24 over a wireless interface on frequency band $f_{band}(2)$.

Masters 26-$j$ being operable to communicate with dependents 28-$k$ over a wireless interface using frequency band $f_{band}(1)$ and with controller 24 over a wired or wireless interface. When communicating with dependents 28-$k$, each master 26-$j$ uses a communication channel defined by a unique frequency hopping sequence $f_j$, wherein the frequency hopping sequence $f_j$ is a part of a finite set of frequency hopping sequences $f_{set}$ within frequency band $f_{band}(1)$. Each master 26-$j$ has an associated communication range $R_j$ in which master 26-$j$ can communicate with dependents 28-$k$. Such communication range $R_j$ defines the coverage area of piconet 22-$j$. Note that a master 26-$j$ in one piconet may also be a dependent in another piconet.

Controller 24 is a communication device being operable to communicate with master 26-$j$, dependents 28-$k$ and base station 30, and having hardware and software for controlling and managing data transmissions among dependents 28-$k$ and masters 26-$j$. Controller 24 communicates with base station 30 over a wireless interface using frequency band $f_{band}(2)$ and with dependents 28-$k$ over a wireless interface using frequency band $f_{band}(1)$. When communicating with dependents 28-$k$, controller 24 uses a communication channel defined by a unique frequency hopping sequence $f_c$, wherein the frequency hopping sequence $f_c$ is also a part of the finite set of frequency hopping sequences $f_{set}$ within frequency band $f_{band}(1)$. Controller 24 has an associated communication range $R_c$ in which controller 24 can communicate with dependents 28-$k$. The range of controller 24 may be supplemented via access points 25, which are devices for extending the range of controller 24. Such communication range $R_c$ defines the geographical area 21 associated with wireless network group 20. Note that there may be gaps 23 in the geographical area 21 where controller 24 may not be able to communicate with dependents 24-$k$. In one embodiment, frequency band $f_{band}(1)$ is approximately 2.4 GHz and frequency band $f_{band}(2)$ is either approximately 800 or 1800 MHz.

Controller 24 interfaces with base station 30 in the following manner. Controller receives data from masters 26-*j* and/or dependents 28-*k* on a communication channel defined by frequency hopping sequence on frequency band $f_{band}(1)$ and subsequently demodulates and re-modulates the data onto a communication channel on frequency band $f_{band}(2)$, and vice-versa.

Dependents 28-*j* are communication devices for communicating with masters 26-*j*, controller 24 and base station 30 or equivalent. Dependents 28-*k* are operable to communicate with any master 26-*j* or controller 24 using any of the frequency hopping sequences $f_j$ or $f_c$ from the finite set of frequency hopping sequences $f_{set}$. Dependents 28-*k* are also operable to communicate with base station 30 over a wireless interface using frequency band $f_{band}(2)$.

When dependents 28-*k* are activated or already active, dependents 28-*k* follow a frequency searching protocol to establish a communication link with a master device or base station 30, wherein master devices include masters 26-*j* and controller 24. Once a communication link is established with a master device, dependents 28-*k* can communicate with base station 30 through the linked master device. Specifically, if the master device is a master 26-*j*, the transmission path spans from dependents 28-*k*, to its master 26-*j*, to controller 24 and to base station 30, and vice-versa. If the master device is controller 24, the transmission path spans from dependents 28-*k*, to controller 24 and to base station 30, and vice-versa. Note that a communication link can also be established directly between a dependent 28-*k* and base station 30.

Figure 3:
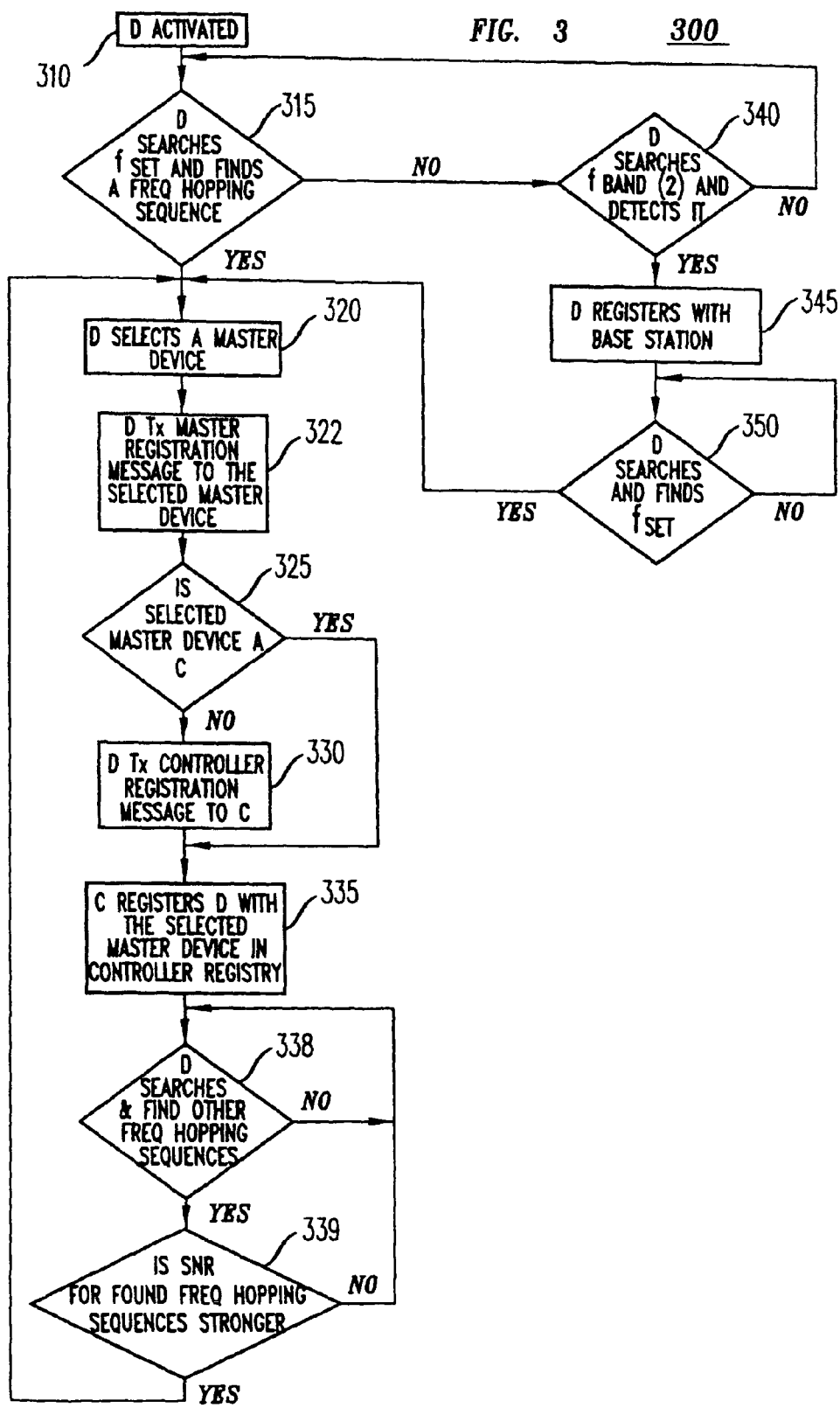
FIG. 3 depicts a flowchart of a frequency searching protocol used in accordance with one embodiment of the present invention.

FIG. 3 depicts a flowchart 300 of a frequency searching protocol used in accordance with one embodiment of the present invention. In step 310, dependent 28-*k* is activated. In step 315, dependent 28-*k* searches for a signal transmitted on any of the frequency hopping sequences $f_j$ or $f_c$ in the finite set of frequency hopping sequences $f_{set}$. If one or more such signals are detected, in step 320, dependent 28-*k* selects a master device associated with the detected signal having the strongest or an acceptable signal-to-noise ratio to be its master. In one embodiment, a signal transmitted on any of the frequency hopping sequences $f_j$ or $f_c$ is deemed detected if it has a signal-to-noise ratio over a threshold value. In one embodiment, if a signal with an acceptable signal-to-noise ratio is detected on any frequency hopping sequence $f_j$ and on frequency hopping sequence $f_c$, the master associated with the frequency hopping sequence $f_j$ is selected as the master device.

In step 322, dependent 28-*k* transmits a master registration message to its selected master device indicating dependent 28-*k*'s selection of its master device. The master registration message being transmitted on the frequency hopping sequence associated with the selected master device. In steps 325 and 335, if the selected master device is controller 24, upon receipt of the master registration message, dependent 28-*k* will be registered with and by controller 24 in a controller registry, which is a database or registry indicating master devices to which dependents 28-*k* are registered.

However, if the selected master device is a master 26-*j*, upon receiving the master registration message, in step 330, the master 26-*j* transmits a controller registration message to controller 24 indicating to controller 24 to register dependent 28-*k* with master 26-*j*. The controller registration message being transmitted on the frequency hopping sequence $f_c$ using a wired or wireless interface. Upon receiving the controller registration message, in step 335, controller 24 registers dependent 28-*k* with master 26-*j* in the controller registry.

Note that if dependent 28-*k* was previously registered with another master device in the controller registry, the previous registration is superseded or replaced with the current registration in the controller registry. In one embodiment, master 26-*j* also registers its dependents 28-*k* in a master registry, which is a database or registry belonging to master 26-*j* and indicating the associated dependents 28-*k*.

Once dependent 28-*k* has been registered with a master device, or has transmitted the master registration message, in step 338, dependent 28-*k* continuously searches for signals transmitted on any of the frequency hopping sequences $f_j$ or $f_c$, but not for signals transmitted on frequency band $f_{band}(2)$. In step 339, if dependent 28-*k* detects one or more such signals with a stronger signal-to-noise ratio than the signal being transmitted by the master device to which dependent 28-*k* is currently registered, dependent 28-*k* will go to step 320 and select a new master device with which to be registered. Otherwise, dependent 28-*k* will continue to search for signals transmitted on any of the frequency hopping sequences $f_j$ or $f_c$. In an alternate embodiment, in step 338, dependent 28-*k* also searches for signals transmitted on frequency band $f_{band}(2)$.

Note that when dependent 28-*k* has been registered in the controller registry, controller 24 transmits a controller-base station registration message to base station 30 or a communications network indicating to base station 30 to set up a communications link for dependent 28-*k* through controller 24, wherein the controller-base station registration message is transmitted on frequency band $f_{band}(2)$. Upon receiving the controller-base station registration message, base station 30 registers dependent 28-*k* in a registry and provides communication services to dependent 28-*k* via controller 24. Once this communication link has been set up, the communication link from and to dependent 28-*k* to master 26-*j* to controller 24 to base station 30 is completed.

Returning to step 315, if no signals transmitted on any frequency hopping sequences $f_j$ or $f_c$ were detected, in step 340, dependent 28-*k* searches for a signal transmitted by base station 30 or a communications network on frequency band $f_{band}(2)$. If such a signal is detected, in step 345, dependent 28-*k* proceeds to register with base station 30, as is well-known in the art. Otherwise, service is denied to dependent 28-*k* and dependent 28-*k* continues to step 315. In one embodiment, a signal transmitted by base station 30 on frequency band $f_{band}(2)$ is deemed detected if it has a signal-to-noise ratio over a threshold value.

After dependent 28-*k* has been registered with base station 30, in step 350, dependent 28-*k* will continue to search for signals transmitted on any of the frequency hopping sequences $f_j$ or $f_c$ on frequency band $f_{band}(1)$. If dependent 28-*k* detects one or more such signals, dependent 28-*k* will go to step 320 and select a master device with which to be registered. When dependent 28-*k* registers with the master device, the master device will subsequently cause controller 24 to re-register dependent 28-*k* at base station 30 via controller 24. For example, when dependent 28-*k* sends a master registration message to its new master device and is subsequently registered at controller 24, as described steps 320-335, controller 24 transmits a base station re-registration message to base station 30 indicating or instructing base station 30 to re-register dependent 28-*k* via controller 24 wherein the base station re-registration message is transmitted on frequency band $f_{band}(2)$. When base station 30 receives the base station re-registration message, base station 30 re-registers dependent 28-*k* via controller 24. By re-registering dependent 28-*k* via controller 24, base station 30 knows to communicate with dependent 28-*k* through controller 24.

Figure 4:
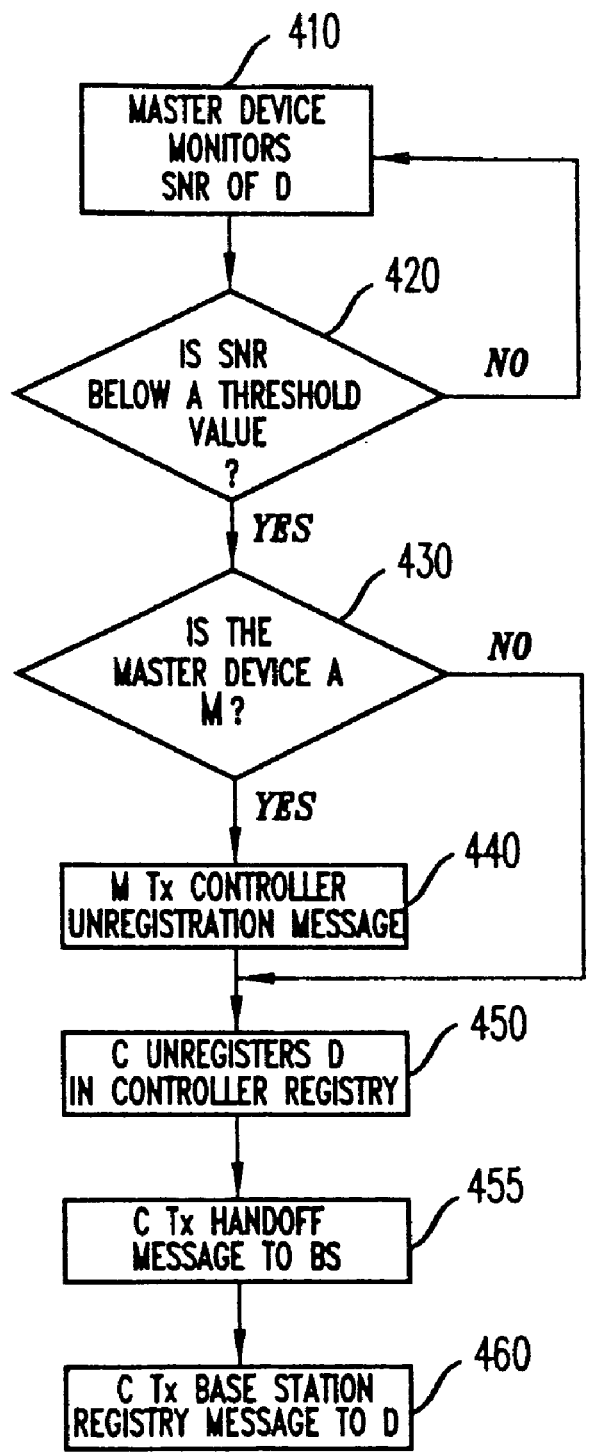
FIG. 4 depicts a flowchart illustrating the operation of a master device.

Once dependent 28-$k$ is registered with a master device, the master device can cause dependent 28-$k$ to be unregistered. FIG. 4 depicts a flowchart 400 illustrating the operation of a master device. In step 410, the master device with which dependent 28 is registered continuously monitors the signal strength or signal-to-noise ratio of signals being transmitted from dependent 28-$k$. In step 420, if such signal strength or signal-to-noise ratio falls below a threshold value or another value, the master device will cause dependent 28-$k$ to be unregistered in the controller registry. In the case where dependent 28-$k$ is currently registered with a master 26-$j$ in the controller registry (i.e., the master device is a master 26-$j$), in steps 430 to 450, master 26-$j$ will transmit a controller unregistration message to controller 24 indicating to controller 24 to unregister dependent 28-$k$ from master 26-$j$ in the controller registry. In the case where dependent 28-$k$ is currently registered with controller 24 in the controller registry (i.e., the master device is controller 24), in steps 430 and 450, controller 24 will unregister dependent 28-$k$ from itself in the controller registry.

Whenever controller 24 unregisters any dependent 28-$k$ without re-registering the same dependent 28-$k$ with another master 26-$j$ or itself (as in the case where dependent 28-$k$ selects a new master device), in step 455, controller 24 will transmit a handoff message to base station 30 indicating to base station 30 the profile of dependent 28-$k$ and to start communicating with the dependent 28-$k$ being unregistered by controller 24 from the controller registry. When base station 30 receives the handoff message, base station 30 re-registers dependent 28-$k$ in its registry such that base station 30 now knows to communicate directly with dependent 28-$k$ (and not through controller 24). The handoff message being transmitted on frequency band $f_{band}(2)$. Subsequently, in step 460, controller 24 transmits a base station registration message to that dependent 28-$k$ indicating or instructing dependent 28-$k$ to search for signals transmitted on frequency band $f_{band}(2)$ and, upon detection, to re-register with base station 30 associated with the detected signal on frequency band $f_{band}(2)$. In another embodiment, once dependent 28-$k$ receives the base station registration message, dependent 28-$k$ starts to communicate directly with base station 30 without searching for signals transmitted on frequency band $f_{band}(2)$. The base station registration message being transmitted on frequency band $f_{band}(2)$. Alternately, the base station registration message may be transmitted on frequency hopping sequence $f_c$ alone or in conjunction with the base station registration message being transmitted on frequency band $f_{band}(2)$.

Note that FIG. 2 depicts an embodiment in which cell 32, i.e., coverage area of base station 30, includes the geographical area 21 associated with wireless network group 20. In other words, any area within geographical area 21 should be within communication range of base station 30 except for gaps 23 in the geographical area 21. Note that in most cases, gaps 23 in geographical area 21 should not be gaps in cell 32. When dependent 28-$k$ leaves a piconet, it is assumed to still be within the geographical area 21 and, thus, should also be within the coverage area of base station 30 thereby allowing dependent 28-$k$ to register with base station 30 once it leaves the piconet 22-$j$. Other embodiments are possible. In another embodiment, the geographical area 21 may be in the coverage areas of two adjacent base stations. In this embodiment, controller 24 may instruct dependent 28-$k$ to register with a particular base station based on the piconet 22-$j$ from which dependent 28-$k$ is leaving. In another embodiment, part of the geographical area 21 is in the coverage area of base station 30 and the other part of the coverage area 21 is not in the coverage area of any base station. In this embodiment, controller 24 may instruct dependent 28-$k$ upon leaving a piconet 22-$j$ to attempt to register with base station 30 regardless of whether dependent 28-$k$ is within cell 32.

It should be understood that although the present invention is described herein with reference to certain embodiments, other embodiments are possible. Accordingly, the present invention should not be limited to the embodiments disclosed herein.

I claim:

1. A method of maintaining a communication link in a communication network comprising:
   initiating, via a master device, unregistration at a controller having a first wireless coverage area, the unregistration being of a dependent in communication with the master device using a communication channel on a frequency band $f_{band}(1)$; and
   transmitting a first message, wirelessly using a frequency $f_{band}(2)$, from the controller to the dependent indicating to the dependent to register with a network element having a second wireless coverage area, the first wireless coverage area being within the second wireless coverage area, the network element being at a higher level than the master device in a hierarchy of the communication network: and
   transmitting a second message, wirelessly using the frequency $f_{band}(2)$, from the controller to the network element indicating to the network element to start communicating with the dependent,
   wherein the dependent is unregistered based on an unregistration message sent to the controller from the master device when the signal strength of a signal transmitted between the dependent and the master device falls below a threshold value, the signal strength being measured at the master device.

2. The method of claim 1 comprising the additional steps of:
   receiving a registration message from the master device on the frequency band $f_{band}(1)$ indicating the dependent; and
   registering the dependent with the master device before the step of unregistering.

3. The method of claim 1 comprising the additional step of:
   transmitting another message indicating to the network element to register the dependent with the network element via the controller.

4. The method of claim 1, wherein the dependent is unregistered when an unregistration message is received.

5. The method of claim 1, wherein the dependent is unregistered when a strength of a signal transmitted between the dependent and the master device on the frequency band $f_{band}(1)$ falls below a threshold value.

6. The method of claim 5 comprising the additional step of:
   monitoring a communication channel associated with the master device on the frequency band $f_{band}(1)$.

7. The method of claim 6, wherein the communication channel is defined by a frequency hopping sequence.

8. The method of claim 1, wherein the message is transmitted using a frequency band $f_{band}(2)$.

9. The method of claim 1 comprising the additional step of:
   transmitting a handoff message to the network element indicating to the network element to communicate directly with the dependent.

10. The method of claim 9, wherein the handoff message is transmitted on the frequency band $f_{band}(2)$.

11. A method for maintaining a communication link in a communication network comprising:
   receiving a first registration message at a first master device from a dependent over a first frequency hopping sequence associated with the master device, the first master device having a first wireless coverage area;
   transmitting a second registration message from the first master device over a second frequency hopping sequence associated with a second master device having a second wireless coverage area, the first wireless coverage area being within the second wireless coverage area, the second master device being at a higher level than the first master device in a hierarchy of the communication network;
   monitoring a strength at the first master device for a signal transmitted by the dependent over the first frequency hopping sequence; and
   transmitting an unregistration message over the second frequency hopping from the first master device to the second master device sequence if the strength of the signal transmitted over the first frequency hopping sequence falls below a threshold value.

12. The method of claim 11, wherein the first and second frequency hopping sequences are part of a set of frequency hopping sequences on a same frequency band.

* * * * *